United States Patent
Kumar et al.

(10) Patent No.: US 6,212,399 B1
(45) Date of Patent: Apr. 3, 2001

(54) METHOD AND APPARATUS FOR CONTROLLING THE POWER RADIATED BY A WIRELESS TERMINAL IN A TELECOMMUNICATIONS SYSTEM BASED ON A VARIABLE STEP SIZE

(75) Inventors: Sarath Kumar, Eatontown; Sanjiv Nanda, Plainsboro; Lei Song, Woodbridge, all of NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/036,153

(22) Filed: Mar. 6, 1998

(51) Int. Cl.⁷ .................................................. H04B 7/00
(52) U.S. Cl. ................................. 455/522; 455/69
(58) Field of Search ........................... 455/522, 69, 70, 455/67.1, 68, 517, 524, 63, 504, 505

(56) References Cited

U.S. PATENT DOCUMENTS

| | | | |
|---|---|---|---|
| 5,604,766 | * 2/1997 | Dohi et al. | 455/69 |
| 5,710,982 | * 1/1998 | Laborde et al. | 455/69 |
| 5,835,527 | * 11/1998 | Lomp | 455/522 |
| 5,896,411 | * 4/1999 | Ali et al. | 455/522 |
| 5,924,043 | * 7/1999 | Takano | 455/522 |
| 5,940,430 | * 8/1999 | Love et al. | 455/522 |
| 5,943,610 | * 8/1999 | Endo | 455/69 |

* cited by examiner

Primary Examiner—Edward F. Urban
Assistant Examiner—Rafael Perez-Gutierrez
(74) Attorney, Agent, or Firm—DeMont & Breyer, LLC; Jason Paul DeMont; Wayne S. Breyer

(57) ABSTRACT

A technique for controlling the power with which a wireless terminal transmits is disclosed. One embodiment of the present invention comprises: transmitting a first signal at a first power level; receiving a series of n power control signals, $b_{i-n+1}$ through $b_i$; setting a step size based on a measure of dispersion of the n power control signals; and transmitting a second signal at a second power level that is based on the first power level and the step size.

28 Claims, 6 Drawing Sheets

100

800

METHOD AND APPARATUS FOR CONTROLLING THE POWER RADIATED BY A WIRELESS TERMINAL IN A TELECOMMUNICATIONS SYSTEM BASED ON A VARIABLE STEP SIZE

FIELD OF THE INVENTION

The present invention relates to telecommunications in general, and, more particularly, to a technique for controlling the power of a signal that is transmitted by a wireless terminal in a wireless telecommunications system.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is a wireless switching center (e.g., Wireless Switching Center 120), which may also be known as a Mobile Switching Center ("MSC") or Mobile Telephone Switching Office ("MTSO"). Typically, Wireless Switching Center 120 is connected via wirelines (e.g., wirelines 102-1 through 102-5) to a plurality of base stations (e.g., base stations 103-1 through 103-5) that are dispersed throughout the geographic area serviced by the system and to local and long-distance telephone and data networks (e.g., local-office 130, local-office 138 and toll-office 140). Wireless Switching Center 120 is responsible for, among other things, establishing and maintaining calls between wireless terminals and between a wireless terminal and a wireline terminal (e.g., wireline terminal 150), which is connected to the system via the local and/or long-distance networks.

The geographic area serviced by a wireless telecommunications system is partitioned into a number of spatially distinct areas called "cells."0 As depicted in FIG. 1, each cell is schematically represented by one hexagon in a honeycomb pattern; in practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with Wireless Switching Center 120.

For example, when wireless terminal 101-1 desires to communicate with wireless terminal 101-2, wireless terminal 101-1 transmits the information-bearing signals to base station 103-1, which relays the signals to Wireless Switching Center 120 via wireline 102-1. Upon receipt of the signals, and with the knowledge that it is intended for wireless terminal 101-2, Wireless Switching Center 120 then returns the signals back to base station 103-1, which relays the signals, via radio, to wireless terminal 101-2.

When wireless terminal 101-1 transmits a signal to base station 103-1, two factors dominate the determination of how much power wireless terminal 101-1 uses to transmit the signal. The first factor pertains to the quality of the received signal and the second factor pertains to the amount of interference caused by the transmission of the signal.

With regard to the first factor, the quality of the signal as received by base station 103-1 is highly correlated to: (1) the amount of power used to transmit the signal and (2) the environmental factors affecting the signal. For example, if wireless terminal 101-1 transmits the signal with too little power, then the risk exists that the quality of the received signal will be unacceptable. When the quality of the received signal is unacceptable, base station 103-1 is unable to process the signal and there is effectively no communication. As the amount of power that wireless terminal 101-1 uses to transmit increases, the signal quality also increases, albeit with diminishing returns.

FIG. 2 depicts a graph that illustrates the relationship between the received signal quality of a signal as a function of the amount of power used to transmit the signal. As is well-known in the prior art, the signal quality can be measured in accordance with a variety of well-known criteria (e.g., signal-to-noise ratio, signal-to-interference ratio, frame error rate, bit error rate, etc.). Furthermore, the amount of power used to transmit a signal can be measured in accordance with a variety of well-known criteria (e.g., absolute power as measured in dBm, average power as measured in dBm, etc.).

Clearly, the first factor mandates that wireless terminal 101-1 transmit each signal at at least the minimum power level; otherwise the signal cannot be processed and the utility of the system is undermined. Furthermore, the first factor suggests that wireless terminal 101-1 transmit each signal with substantially more power than the minimum to provide a margin of safety.

With regard to the second factor, the extent to which wireless terminal 101-1 interferes with the signals of other wireless terminals (e.g., wireless terminals 101-2 and 101-3, etc.) is highly correlated to the amount of power used by wireless terminal 101-1 to transmit its signals. For example, if wireless terminal 101-1 transmits the signal with too much power, then the signals from wireless terminals 101-2 and 101-3 cannot be received with acceptable signal quality. Therefore, the confluence of the two factors suggests that wireless terminal 101-1 should transmit its signals with as much power as necessary to ensure that its signal is received with satisfactory quality, but no more.

FIG. 3 depicts a graph of the interference caused by a wireless terminal as a function of the amount of power used by that wireless terminal to transmit its signals. As is well-known in the prior art, the interference can be measured in a variety of well-known criteria (e.g., signal-to-noise ratio, signal-to-interference ratio, frame error rate, bit error rate, etc.).

In summary, the two factors for determining the amount of power used for transmitting signals oppose each other and a balance must be maintained at all times at each wireless terminal to ensure that its signals are received with satisfactory quality yet do not unnecessarily interfere with any other wireless terminals.

A first technique in the prior art for maintaining that balance is based on: (1) the fact that the quality of the signal is highly correlated to the amount of power used to transmit the signal, and (2) the fact that the signal quality must remain at or above some minimum for the system to have any utility. In accordance with the first technique, base station 103-1 continually measures the signal quality of the signals transmitted by wireless terminal 101-1 and compares the measured quality against a target quality, called the SIR Target. If the measured quality for the signal is below the SIR Target, the base station sends a message to the wireless terminal directing it to transmit its next signal at an increased power level. In contrast, if the measured quality for the signal is at or above the SIR Target, the base station sends a message to the wireless terminal directing it to transmit its next signal at an decreased power level.

The operation of the first technique is described in detail in the flowchart of FIG. 4. The first technique begins at step 401 at which base station 103-1 establishes a minimum acceptable level of signal quality for the signals received from wireless terminal 101-1. This minimum is called the SIR Target.

At step 402, base station 103-1 receives a signal, $S_{i-1}$ from wireless terminal 101-1 and compares the quality of the signal against the SIR Target. If at step 403 the measured signal quality is below the SIR Target, control passes to step 404 and a power control signal $b_i$ is set to +1, which will direct wireless terminal 101-1 to transmit its next signal at an increased power level equal to the old power level, $P_{i-1}$, plus a step size, Q. Alternatively, control passes to step 405 and the power control signal $b_i$ is set to −1, which will direct wireless terminal 101-1 to transmit its next signal at a decreased power level equal to the old power level, $P_{i-1}$, minus the step size, Q.

At step 406, base station 103-1 transmits the power control signal $b_i$ to wireless terminal 101-1, and at step 407, wireless terminal 101-1 receives the power control signal $b_i$ transmitted at step 406.

At step 408, wireless terminal determines the power level, $P_i$, at which signal, $S_i$, is to be transmitted. Typically, the power level, $P_i$, is based on the previous power level, $P_{i-1}$, the power control signal, $b_i$, received at step 407, and the step size Q. In particular, $$P_i = P_{i-1} + Q \cdot b_i$$

From step 408, control passes to step 409, at which the signal, $S_i$, is transmitted at the power level $P_i$.

The first technique is disadvantageous, however, in that a single, fixed step size is often too coarse for situations in which the environmental factors affecting the propagation of the signal vary slowly. This is the rule rather than the exception for telecommunications systems in which wireless terminal 101-1 is immobile. The problem with coarse step size adjustments in situations such as this is that the power level of successively transmitted signals vacillates wildly between too much power and too little power.

A second technique exists in the prior art that attempts to ameliorate the vacillating power level of successively transmitted signals. In this technique, which is an extension of the first technique, wireless terminal 101-1 is capable of setting its step size to one of three values (e.g., 1.0 dB, 0.5 dB and 0.25 dB). Consequently, wireless terminal 101-1 can adjust its power level by 1.0 dB when the environmental factors are changing quickly, 0.5 dB when the environmental factors are changing less quickly, and 0.25 when the environmental factors are changing slowly.

The disadvantage of the second technique is that base station 103-1 only transmits one bit per power control signal, and, therefore, there is no mechanism for quickly and efficiently directing when wireless terminal 101-1 should use a given step size. The proposed solution to this deficiency is to enable base station 103-1 to send a special message, called a power control parameter update message ("PCPUM"), to wireless terminal 101-1 periodically or sporadically to set the step size that wireless terminal 101-1 uses at any given time. This solution is disadvantageous, however, in that it is too slow for situations in which the environmental factors vacillate quickly between turmoil and quiescence.

Therefore, the need exists for a technique for controlling the power level at which a wireless terminal transmits that is responsive to situations in which the environmental factors vacillate quickly between turmoil and quiescence.

SUMMARY OF THE INVENTION

The present invention controls the power with which a wireless terminal transmits without some of the costs and disadvantages in the prior art. In particular, some embodiments of the present invention are responsive to situations in which the environmental factors vacillate quickly between turmoil and quiescence, and some embodiments do not require a power control parameter update message to change the step size.

The illustrative embodiment of the present invention determines the appropriate step size to use at any given time by analyzing the last n received power control signals. When the ability of the illustrative embodiment to track the SIR Target is taxed (perhaps because of multipath fading), the last n received power control signals will exhibit a smaller measure of statistical dispersion then when the ability of the illustrative embodiment to track the SIR Target is not taxed. Therefore, a measure of the dispersion of the last n received power control signals can be used as a reasonable guide in setting the step size.

One embodiment of the present invention comprises: transmitting a first signal at a first power level; receiving a series of n power control signals, $b_{i-n+1}$ through $b_i$; setting a step size based on a measure of dispersion of the n power control signals; and transmitting a second signal at a second power level that is based on the first power level and the step size.

DETAILED DESCRIPTION

Figure 1:
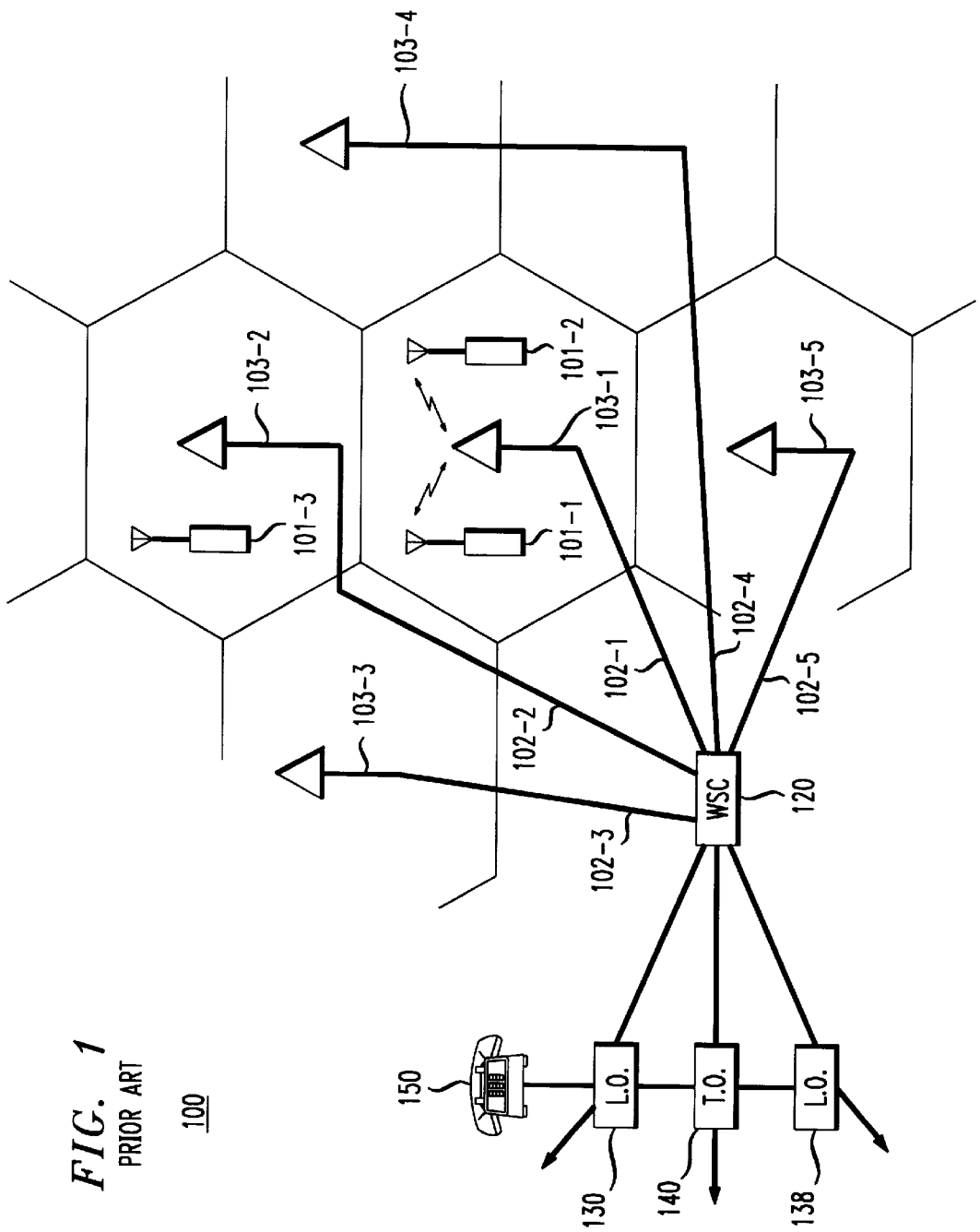
FIG. 1 depicts a schematic diagram of a wireless telecommunications system in the prior art.
Figure 2:
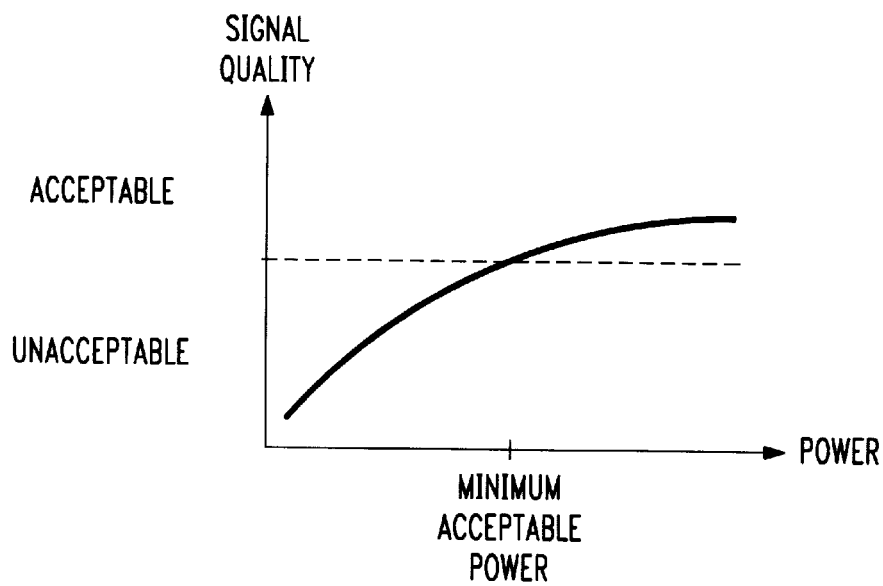
FIG. 2 depicts a graph of signal quality as a function of power in the prior art.
Figure 3:
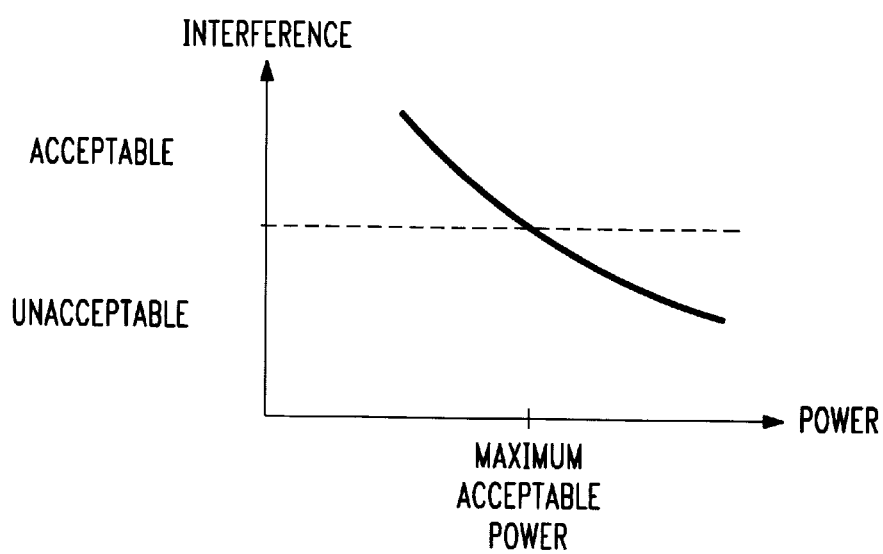
FIG. 3 depicts a graph of interference as a function of power in the prior art
Figure 4:
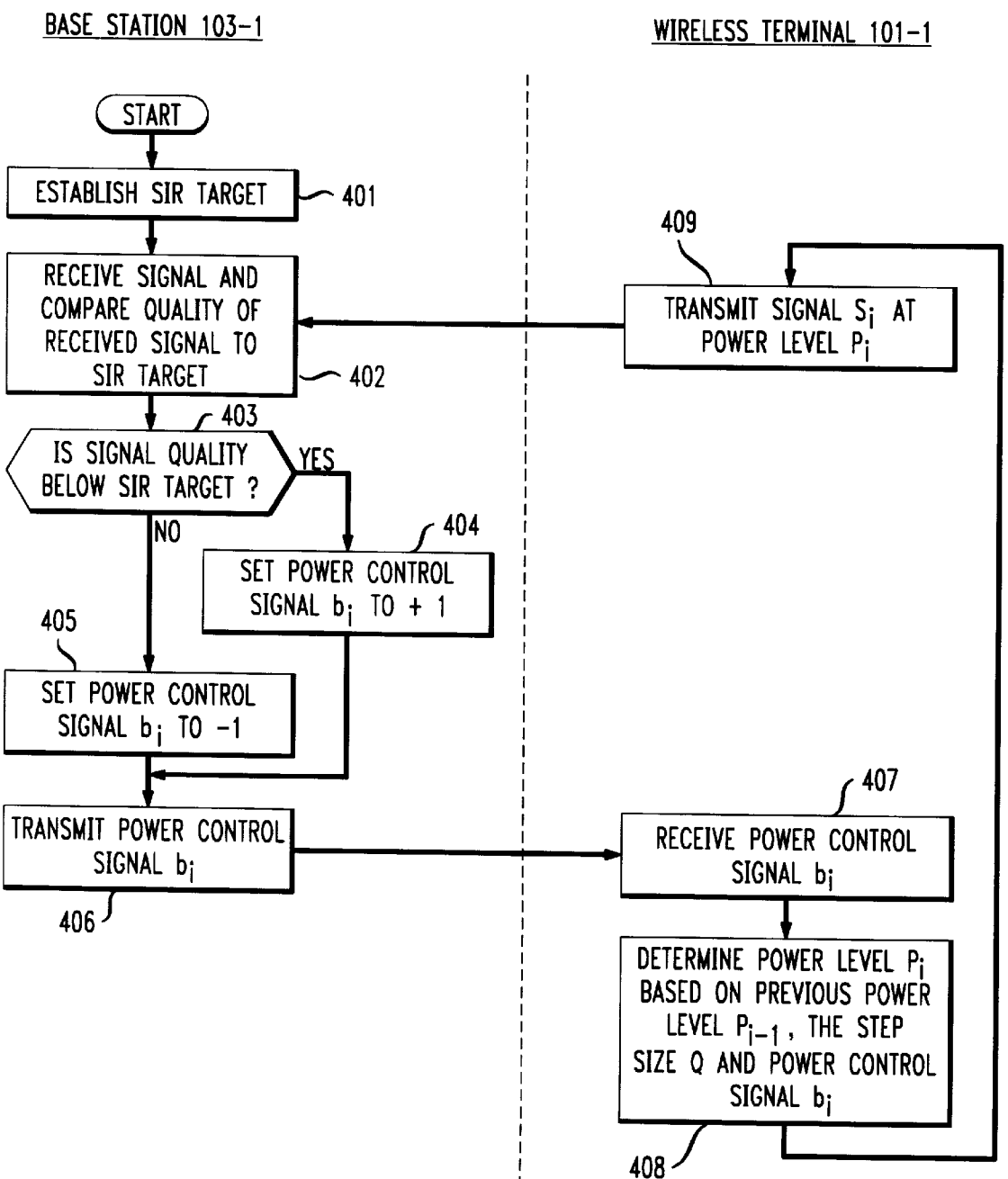
FIG. 4 depicts a flowchart of one technique in the prior art for controlling the power with which a wireless terminal transmits successive signals.
Figure 5:
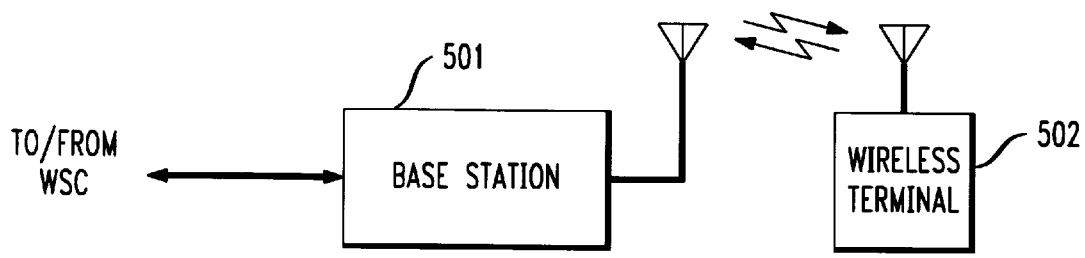
FIG. 5 depicts a schematic diagram of a base station and a wireless terminal in accordance with the illustrative embodiment of the present invention.

FIG. 5 depicts a block diagram of the illustrative embodiment of the present invention, which comprises base station 501 and wireless terminal 502. Base station 501 is capable of receiving signals from wireless terminal 502 and forwarding them to a wireless switching center (not shown), in well-known fashion. Furthermore, base station 501 is capable of receiving signals from the wireless switching center and transmitting them to wireless terminal 502, also in well-known fashion. In addition to these functions, base station 501 participates in a process for controlling the amount of power that wireless terminal 502 uses to transmit its signals. The functionality performed by base station 501 with regard to this process is discussed below.

Some embodiments of the present invention are compatible with existing air-interface standards (e.g., Interim Standard 95 CDMA, etc.), although other embodiments of the present invention require amendments to the standards. Regardless, it will be clear to those skilled in the art how to make embodiments of the present invention that are compatible with existing air-interface standards and how to amend existing air-interface standards to provide for the necessary signals for other embodiments.

Figure 6:
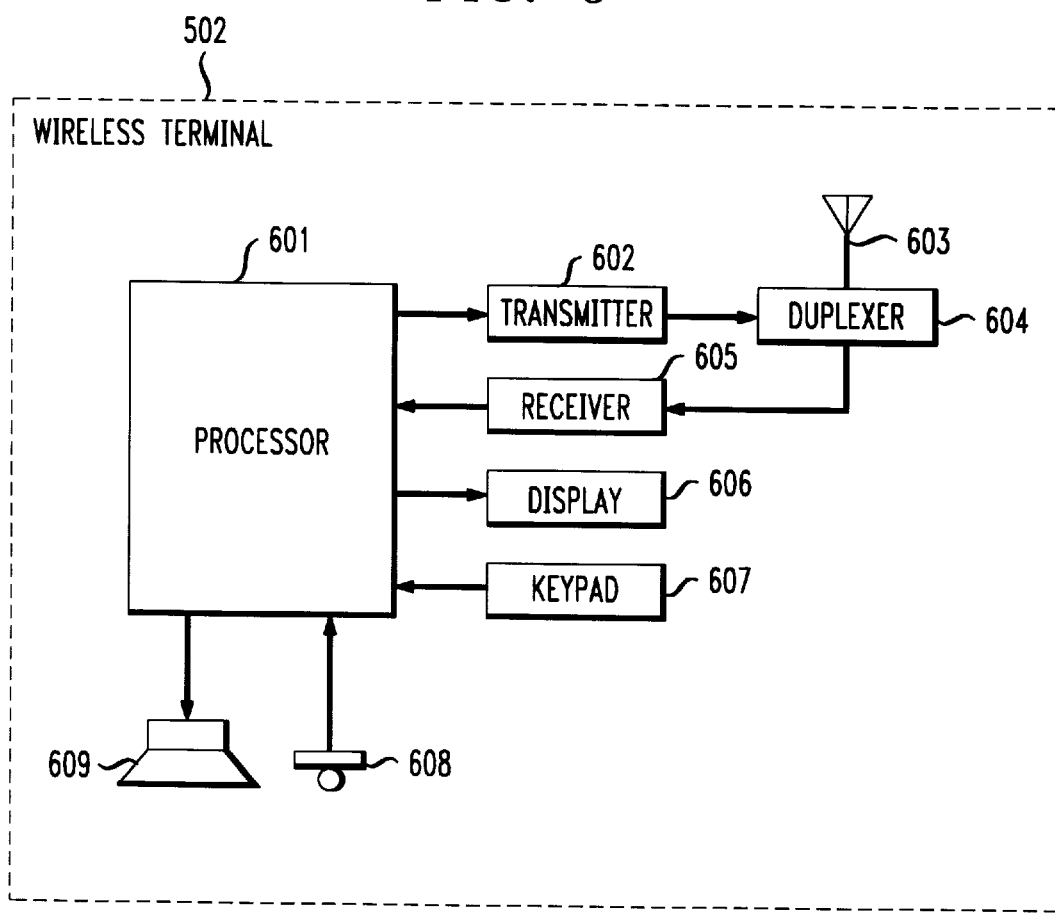
FIG. 6 depicts a block diagram of the salient components of the wireless terminal in FIG. 5.

FIG. 6 depicts a block diagram of the salient components of wireless terminal 502, which comprises: processor 601, transmitter 602, antenna 603, duplexer 604, receiver 605, display 606, keypad 607, microphone 608, and speaker 609, interconnected as shown. Transmitter 602, antenna 603, duplexer 604, display 606, keypad 607, microphone 608, and speaker 609 are all well-known in the art and it will be clear to those skilled in the art how to make, use and interrelate them as components of wireless terminal 502.

Figure 7:
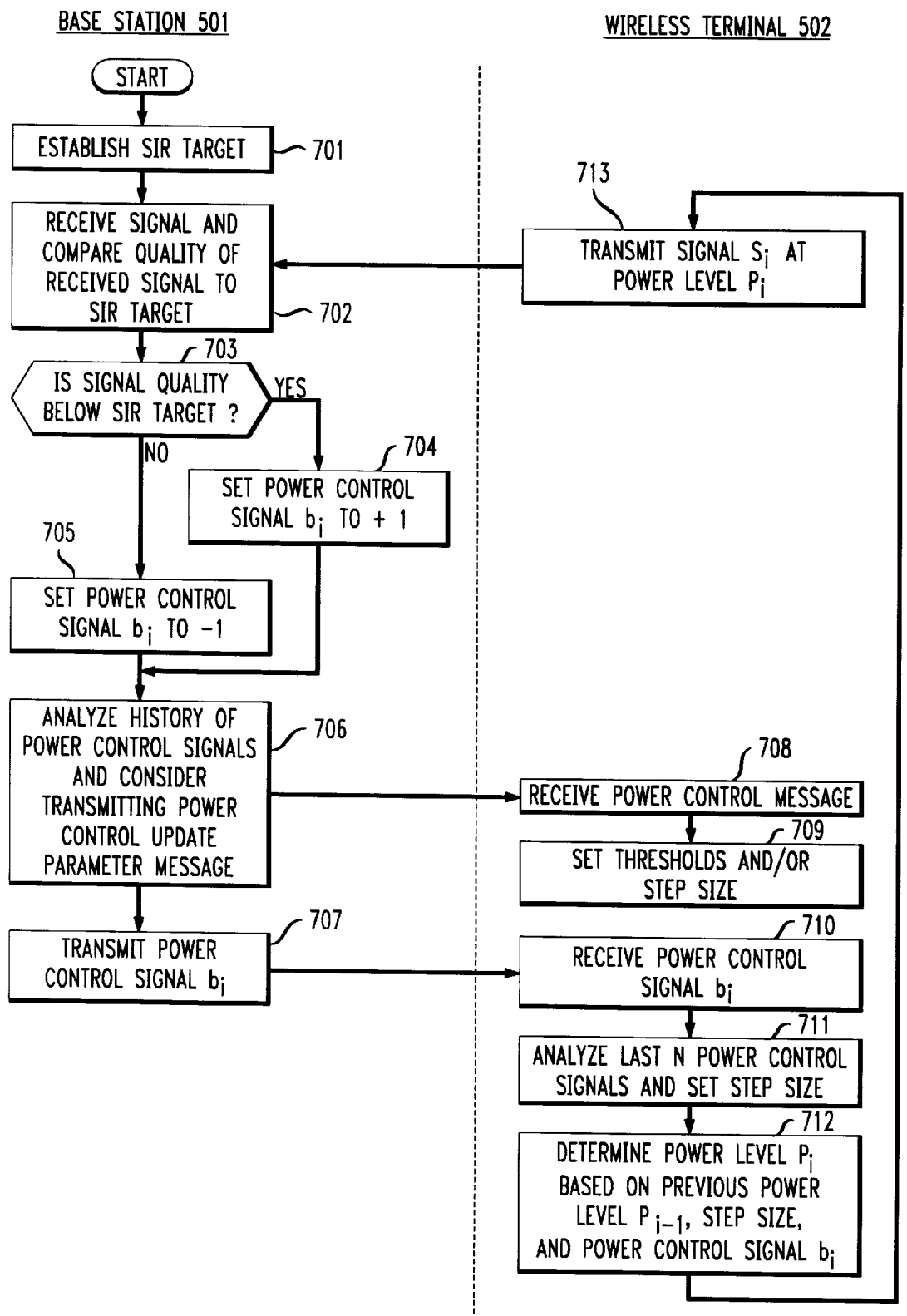
FIG. 7 depicts a flowchart of the operation of the illustrative embodiment.

Processor 601 is advantageously a general-purpose digital processor with associated RAM, ROM, and I/O that is programmed to function as a wireless terminal and to perform the steps depicted in FIG. 7. Transmitter 602 is advantageously capable of transmitting a signal, $S_i$, at a power level, $P_i$, via duplexer 604 and antenna 603 and under the direction of processor 601. It will be clear to those skilled in the art how to make and use transmitter 602.

Receiver 605 is capable of receiving, in well-known fashion, a power control signal, $b_i$, in response to a signal, $S_{i-1}$, that was previously transmitted by transmitter 602 at a power level, $P_{i-1}$. In response to a series of n signals, $S_{i-n}$ through $S_{i-1}$, transmitted by transmitter 602, receiver 605 is therefore capable of receiving a series of n power control signals, $b_{i-n+1}$ through $b_i$. Advantageously, each of the n power control signals represents either +1 or −1, which represents a command to increase or decrease, respectively, the transmit power level.

Figure 8:
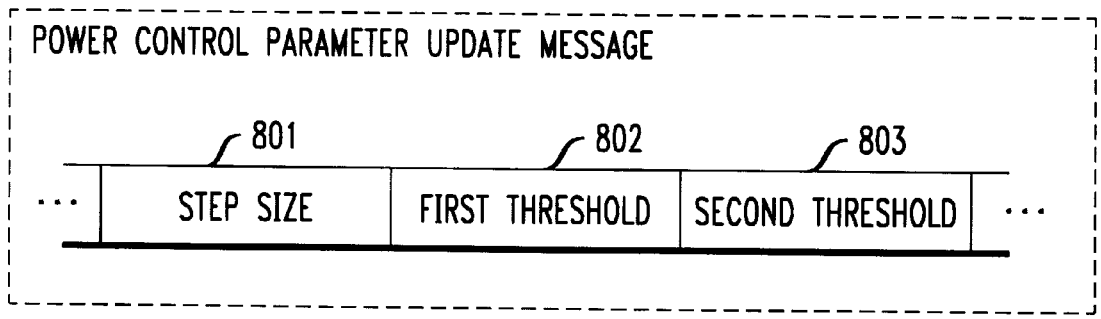
FIG. 8 depicts a power control parameter update message in accordance with the illustrative embodiment.

Furthermore, receiver 605 is advantageously, but not necessarily, capable of receiving a power control parameter update message transmitted by base station 501—the salient fields of which are depicted in FIG. 8. The power control parameter update message advantageously provides up to three parameters for use by processor 601 in determining $P_i$. The nature and utility of the three parameters will be discussed below.

FIG. 7 depicts a flowchart of the operation of the illustrative embodiment in controlling the amount of power that wireless terminal 502 uses to transmit its signals.

The illustrative embodiment begins at step 701 at which base station 501 establishes a minimum acceptable level of signal quality for the signals received from wireless terminal 502. This minimum is called the SIR Target.

At step 702, base station 501 receives a signal, $S_{i-1}$, from wireless terminal 502 and compares the quality of the signal against the SIR Target. If the measured signal quality is below the SIR Target, control passes to step 704 and the power control signal $b_i$ is set to +1. Alternatively, control passes to step 705 and the power control signal $b_i$ is set to −1.

At step 706, base station 501 advantageously analyzes the last k power control signals, $b_{i-k+1}$ through $b_k$, using conventional statistical techniques to estimate if the value of one or more of the three parameters that wireless terminal 502 uses in determining $P_i$ is hindering the efficacy of wireless terminal 502 to track the SIR Target. The nature of the three parameters and their effect on the efficacy of wireless terminal 502 to track the SIR Target will be discussed below.

If base station 501 determines that the value of one or more of the three parameters is hindering the ability of wireless terminal 502 to track the SIR Target, then base station 501 derives new values for those parameters and constructs a power control parameter update message, as shown in FIG. 8. The power control parameter update message is then transmitted to wireless terminal 502. Advantageously, power control parameter update messages are transmitted infrequently because their transmission taxes the bandwidth of the channel from base station 501. It is clear that step 706 can be done in wireless terminal 502.

Processor 601 maintains three parameters (ie., the step size, the first threshold, and the second threshold) for the purpose of assisting wireless terminal 502 in determining the SIR Target. At step 708, wireless terminal 502 receives a power control parameter update message that sets the value of one or more of these parameters. Table 1 lists each of the three parameters and the values to which they can be set by a power control parameter update message. For example, at step 709 a power control parameter update message could set just the step size to one of the three values, or could set either or both thresholds or could set the step size and either or both thresholds.

TABLE 1

| Parameter | Permissible Values |
|---|---|
| Step Size - Q | 1.0 dB, 0.5 dB, and 0.25 dB |
| First Threshold - $T_1$ | $0 \leq T_1 \leq T_2 \leq n$ |
| Second Threshold - $T_2$ | $0 \leq T_1 \leq T_2 \leq n$ |

Regardless of whether a power control parameter update message is transmitted at step 706, control passes to step 707, at which point the power control signal $b_i$ is sent to wireless terminal 502.

At step 710, wireless terminal 502 receives the power control signal $b_i$ transmitted at step 707. At step 711, wireless terminal 502 analyzes the last n received power control signals, $b_{i-n+1}$ through $b_i$, in order to determine the step size by which the last power level $P_{i-1}$ should be adjusted to create the power level $P_i$ for the next signal to be transmitted, $S_i$. Advantageously the analysis is based on a statistical measure of the dispersion, D, of the last n received power control signals, $b_{i-n+1}$ through $b_1$. For example, the measure could be based on the standard deviation, the dispersion or on the absolute value of the sum of the last n received power control signals, $b_{i-n+1}$ through $b_i$, as shown in Equation 1.

$$D = \left| \sum_{k=i-n+1}^{i} b_k \right| \qquad \text{(Eq. 1)}$$

For the measure of dispersion shown in Equation 1, the range of values that D can take is from 0 to n. It will be clear to those skilled in the art that the range of values that D can assume is based on the particular measure of dispersion used and the meaning ascribed to the power control signals $b_{i-n+l}$ through $b_i$.

It will also be clear to those skilled in the art that values of n that are too large cause wireless terminal 502 to be sluggish to changes in environmental conditions, and values that are too small make wireless terminal 502 too sensitive to transmission errors in the power control signals.

When the ability of wireless terminal 502 to radiate at the SIR Target is taxed (perhaps because of multipath fading), then the largest step size should be used by wireless terminal 502 to enable it to quickly adapt to rapidly changing conditions. Furthermore, when the ability of wireless terminal 502 to track the SIR Target is taxed, the majority of the last n received power control signals will be all +1 or all −1. In either case, Equation 1 provides large values of D in this case.

In contrast, when the ability of wireless terminal 502 to radiate at the SIR Target is not taxed, then one of the smaller step sizes should be used by wireless terminal 502 to prevent unnecessarily wild fluctuations in the radiated power. In such case, the tendency will be for the last n received power control signals to be more evenly divided between +1 and −1, which results in small values of D.

Therefore, the value of D can be reasonably used for setting the step size, Q, for which wireless terminal 502 adjusts the last power level $P_{i-1}$ to create the power level $P_i$ for the next signal to be transmitted, $S_i$. In other words, the step size Q can be reasonably based on either a continuous or discrete function of the dispersion, D, of the last n power control signals $b_{i-n+1}$ through $b_i$. For example, at step 711 in FIG. 7, the step size, Q, could be based on the inverse of the standard deviation of the last n power control signals $b_{i+n+1}$ through $b_i$. Alternatively the value of D could be compared against an arbitrary number of thresholds, which would make Q a discrete function of D.

Figure 9:
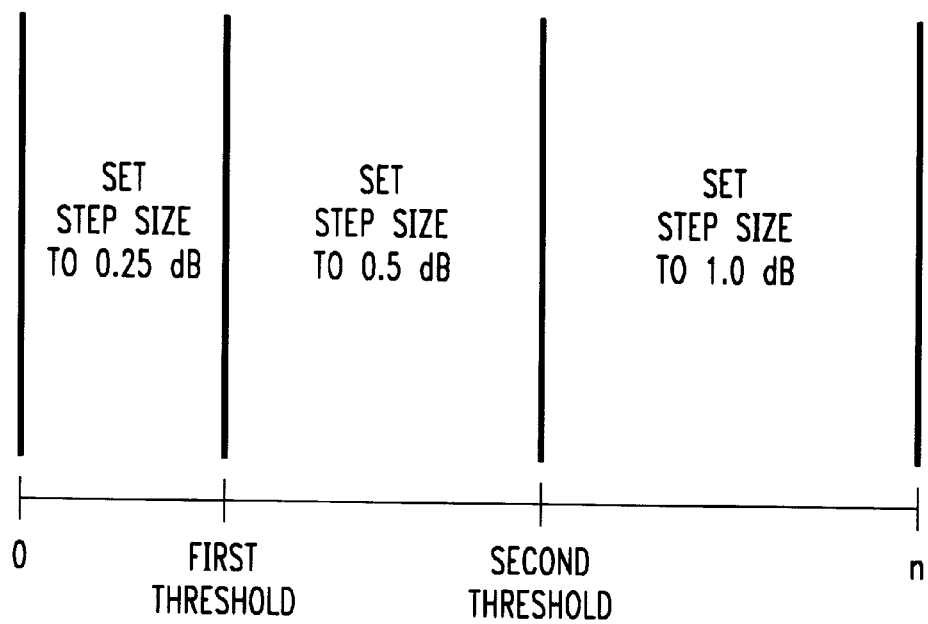
FIG. 9 depicts a graph of the criterion and relevant thresholds for determining the step size in accordance with the illustrative embodiment.

As shown in FIG. 9, the value of D is compared against the two parameters from above: (1) the first threshold, $T_1$, and (2) the second threshold, $T_2$. When D is less than the first threshold, processor 601 sets the step size to a first value (e.g., 0.25 dB). When D is greater than or equal to the first threshold and less than the second threshold, processor 601 sets the step size to a second value (e.g., 0.5 dB), and when D is greater than or equal to the second threshold, processor 601 sets the step size to a third value (e.g., 1.0 dB). In this way, wireless terminal 502 adjusts to using the step size that is most appropriate for the circumstances.

Although the values for the first threshold and the second threshold can be set and reset as data on their efficacy accrues, a reasonable value for the first threshold, $T_1$, is:

$$T_1 = \frac{Q_s}{Q_l} n \quad \text{(Eq. 2)}$$

where $Q_s$ is the smallest step size, $Q_l$ is the largest step size, and n is the number of power control signals over which D is computed. For $Q_s$=0.25 dB, and $Q_l$=1.0 dB, Equation 2 yields a value for the first threshold parameter of n/4.

Similarly, a reasonable value for the second threshold, $T_2$, is:

$$T_2 = \frac{Q_m}{Q_l} n \quad \text{(Eq. 3)}$$

where $Q_m$ is the intermediate step size, $Q_l$ is the largest step size, and n is the number of power control signals over which D is computed. For $Q_m$=0.5 dB, and $Q_l$=1.0 dB, Equation 3 yields a value for the second threshold parameter of n/2.

At step 712, wireless terminal 502 determines the power level, $P_i$, at which signal, $S_i$, is to be transmitted. Advantageously, the power level, $P_i$, is based on the previous power level, $P_{i-1}$, the power control signal, $b_i$, received at step 710, and the step size determined at step 711. In particular, $$P_i = P_{i-1} + Q * b_i \quad \text{(Eq. 4)}$$

where the power levels are in the logarithmic domain. From step 712, control passes to step 713, at which the signal, $S_i$, is transmitted at the power level $P_i$, and the process repeats.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   transmitting a first signal at a first power level;
   receiving a series of n power control signals, $b_{i-n+1}$ through $b_i$, wherein n>1;
   setting a step size to a first value when an absolute value of the sum of the magnitude of said n power control signals is less than a first threshold;
   setting said step size to a second value when said absolute value of the sum of the magnitude of said n power control signals is greater than said first threshold and less than a second threshold;
   setting said step size to a third value when said absolute value of the sum of the magnitude of said n power control signals is greater than said second threshold; and
   transmitting a second signal at a second power level that is based on said first power level and said step size.

2. The method of claim 1 further comprising receiving a power control parameter update message that sets said first threshold and said second threshold.

3. The method of claim 1 wherein said second power level is also based on said power control signal $b_i$.

4. The method of claim 1 wherein said first value is 1.0 dB, said second value is 0.5 dB, said third value is 0.25 dB, and said second power level equals said first power level plus said step size times said power control signal $b_i$.

5. The method of claim 1 wherein said first threshold equals n/4 and said second threshold equals n/2.

6. A wireless terminal comprising:
   a receiver for receiving a series of n power control signals, $b_{i-n+1}$ through $b_i$, wherein n>1;
   a transmitter for transmitting a first signal at a first power level and a second signal at a second power level that is based on said first power level and a step size;
   a processor for receiving said n power control signals from said receiver, for setting said step size to a first value when an absolute value of the sum of the magnitude of said n power control signals is less than a first threshold; setting said step size to said second value when said absolute value of the sum of the magnitude of said n power control signals is greater than said first threshold and less than a second threshold, and setting said step size to a third value when said absolute value of the sum of the magnitude of said n power control signals is greater than said second threshold.

7. The wireless terminal of claim 6 wherein said processor also receives a power control parameter update message that sets said first Threshold and said second threshold.

8. The wireless terminal of claim 6 wherein said second power level is also based on said power control signal $b_i$.

9. The wireless terminal of claim 6 wherein said first value is 1.0 dB, said second value is 0.5 dB, said third value is 0.25 dB, and said second power level equals said first power level plus said step size times said power control signal $b_i$.

10. The wireless terminal of claim 6 wherein said first threshold equals n/4 and said second threshold equals n/2.

11. A method comprising:

transmitting a first signal at a first power level;

receiving a series of n power control signals, $b_{i-n+1}$ through $b_i$, wherein n>1;

setting a step size to a first value when an absolute value of the sum of the magnitude of said n power control signals is less than a first threshold;

setting said step size to a second value when said absolute value of the sum of the magnitude of said n power control signals is greater than said first threshold; and transmitting a second signal at a second power level that is based on said first power level and said step size.

12. The method of claim 11 further comprising the steps of:

setting said step size to said second value when said absolute value of the sum of the magnitude of said n power control signals is greater than said first threshold and less than a second threshold; and setting said step size to a third value when said absolute value of the sum of the magnitude of said n power control signals is greater than said second threshold.

13. The method of claim 12 further comprising the step of receiving a power control parameter update message that sets said first threshold and said second threshold, and sets said step size to one of said first value, said second value, and said third value.

14. The method of claim 12 wherein said first threshold equals n/4 and said second threshold equals n/2.

15. The method of claim 11 wherein said second power level is also based on said power control signal $b_i$.

16. The method of claim 11 wherein said second power level equals said first power level plus said step size times said power control signal $b_i$.

17. The method of claim 11 further comprising the step of receiving a power control parameter update message that sets said first threshold.

18. A wireless terminal comprising:

a receiver for receiving a series of n power control signals, $b_{i-n+1}$ through $b_i$, wherein n>1;

a transmitter for transmitting a first signal at a first power level and a second signal at a second power level that is based on said first power level and a step size;

a processor for receiving said n power control signals from said receiver, for setting said step size to a first value when an absolute value of the sum of the magnitude of said n power control signals is less than a first threshold, and for setting said step size to a second value when said absolute value of the sum of the magnitude of said n power control signals is greater than said first threshold.

19. The wireless terminal of claim 18 wherein said processor sets said step size to said second value when said absolute value of the sum of the magnitude of said n power control signals is greater than said first threshold and less than a second threshold, and sets said step size to a third value when said absolute value of the sum of the magnitude of said n power control signals is greater than said second threshold.

20. The wireless terminal of claim 19 wherein said processor is capable of receiving a power control parameter update message that sets said first threshold and said second threshold, and sets said step size to one of said first value, said second value, and said third value.

21. The wireless terminal of claim 19 wherein said first threshold equals n/4 and said second threshold equals n/2.

22. The wireless terminal of claim 18 wherein said second power level is also based on said power control signal $b_i$.

23. The wireless terminal of claim 18 wherein said second power level equals said first power level plus said step size times said power control signal $b_i$.

24. The wireless terminal of claim 18 wherein said processor is capable of receiving a power control parameter update message that sets said first threshold.

25. A method comprising:

transmitting a first signal at a first power level;

receiving a series of n power control signals, $b_{i-n+1}$ through $b_i$, wherein n>1;

setting a step size based on an absolute value of the sum of the magnitude of said n power control signals, $b_{i-n+1}$ through $b_i$; and transmitting a second signal at a second power level that is based on said first power level and said step size.

26. The method of claim 25 wherein said second power level is also based on said power control signal $b_i$.

27. A wireless terminal comprising:

a receiver for receiving a series of n power control signals, $b_{i-n+1}$ through $b_i$, wherein n>1;

a transmitter for transmitting a first signal at a first power level and a second signal at a second power level that is based on said first power level and a step size;

a processor for receiving said n power control signals from said receiver, and for setting said step size based on an absolute value of the sum of the magnitude of said n power control signals, $b_{i-n+1}$ through $b_i$.

28. The wireless terminal of claim 27 wherein said second power level is also based on said power control signal $b_i$.

* * * * *